Figure 1:
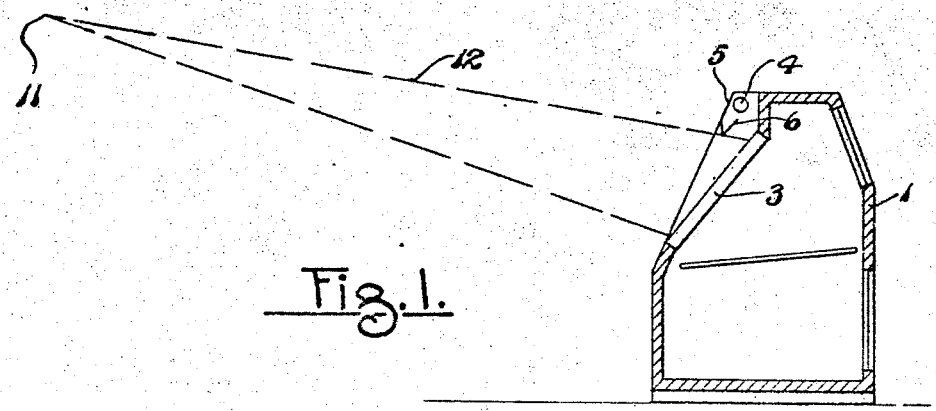

June 20, 1939.  C. B. SHREVE  2,162,791
GLARE ELIMINATOR
Filed Oct. 18, 1937

Inventor
Clifford B. Shreve
Attorneys

Patented June 20, 1939

2,162,791

UNITED STATES PATENT OFFICE 2,162,791

GLARE ELIMINATOR

Clifford B. Shreve, Niles, Mich., assignor to Tyler Fixture Corporation, Niles, Mich., a corporation of Michigan Application October 18, 1937, Serial No. 169,613

5 Claims. (Cl. 240—6)

This invention relates to glare eliminators, particularly with reference to display cases of the refrigerated type in which a front display window or section is provided, usually with several panes of glass located one behind the other and sealed in the case for effectively insulating the case against heat entrance and refrigeration losses, and in which, from an upper point directly in front of the upper part of the case lights are provided, the rays of which are directed downwardly through the glass into the case to display the contents which are located back of the glass.

The light or lights which are used are covered with a housing above and in front of the lights which however cannot be carried downwardly beyond a certain point, otherwise there will be interference with the vision of the observer who examines the merchandise displayed. The rays of light from the lights, usually electric lights, extend in all directions radially from the source of light and downwardly and to the rear through the glass, but some of the rays of light are reflected from the glass plates and are projected forwardly and upwardly into the eyes of the observer, thereby interfering with vision and producing an undesired glare which it is a purpose of the present invention to remove and eliminate.

With my invention in the particular zone or zones where the light reflection takes place so that the reflected rays of light reach the eye of the observer, there are located preferably between the several panes of glass which have been noted, opaque vanes extending the length of the glass and between adjacent panes of glass and which are located substantially in radial planes coincident with the rays of light which would be directed through the glass at the places where such vanes are located. There is thus provided a minimum of interference with the direct passage of the rays of light from the source of light into the show case, and at the same time reflected light from those parts of the glass back of the vanes is intercepted. The vanes produce, in effect, the same obstruction to reflected light as would a downward further projection of the housing over the light source, but without in any material way interfering with the vision of the observer who is enabled to readily see the merchandise, such as meat or the like, which is displayed in the refrigerated show case.

Also with my invention, at the lower outer edge of the housing which covers the electric lights, an upwardly and inwardly inclined plate is provided which has the effect of interposing between the housing which covers the lights and the glass and prevents reflection of light from the inner side of said covering housing to the glass and a consequent reflection and production of the image of the housing to the observer.

Figure 2:
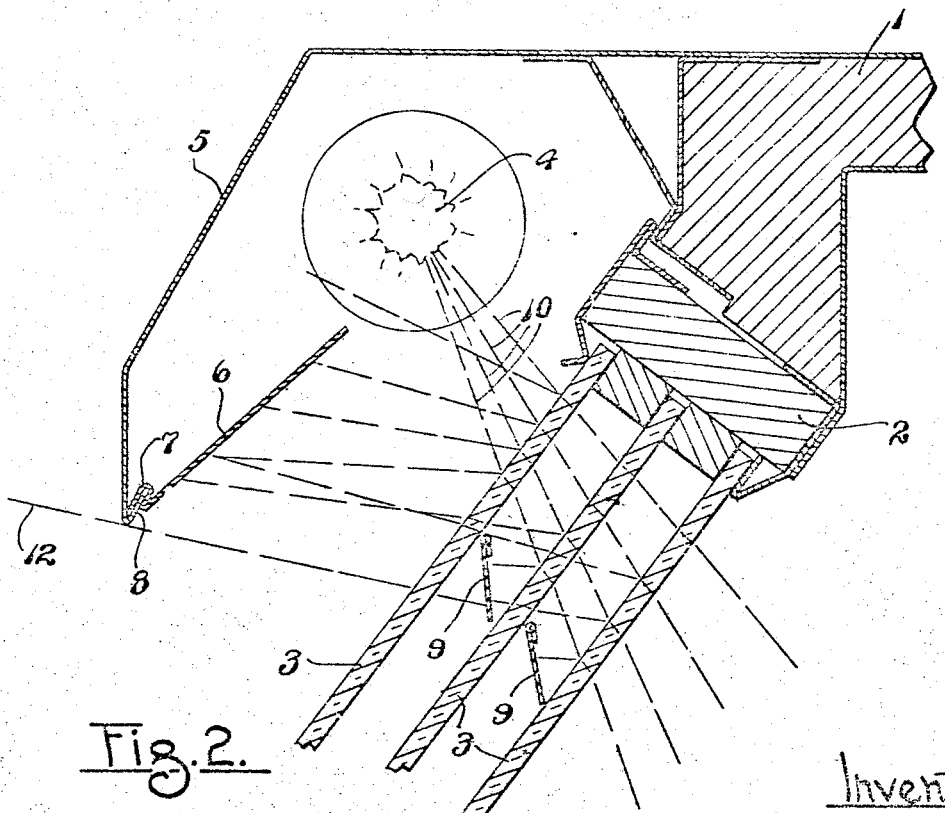

An understanding of the invention may be had from the following description, taken in connection with the accompanying drawing, in which:

Fig. 1 is a vertical cross section through a refrigerated show case of the type to which my invention may be applied, and Fig. 2 is a fragmentary enlarged vertical section of the upper front portion of the case and the lighting fixtures applied thereto.

Like reference numerals refer to like parts in the several figures of the drawing.

The show case 1 is of conventional form and construction and in the type shown illustrates a show case such as used in meat markets for the holding, displaying, and dispensing of meats. Such cases at their front sides are provided with a downwardly and forwardly inclined transparent panel including an outer frame 2 and a plurality of spaced apart glass plates 3 which are properly sealed in the frame 2 to prevent, as much as possible, loss of refrigeration.

In cases of this kind the lighting is by means of suitable light bulbs 4 which are located at the upper part and slightly in front of the case and above and in front of the upper edge portions of the glass plates 3, as best shown in Fig. 2. These light bulbs are housed in a housing 5 which extends over and downwardly a distance in front of the location of the light bulbs, and is provided with an upwardly and inwardly inclined plate 6 preferably connected as shown by providing a U-shaped clip 7 at its lower edge to engage with an upwardly and inwardly turned lip 8 at the lower end portion of the housing 5.

With my invention vanes 9 are disposed between the plates 3 in the space provided between said plates and are located substantially radially with respect to the center longitudinal line of the light bulbs 4. These vanes are relatively narrow in comparison to their length, their width being governed by the available distance between the plates 3. The vane 9 between the innermost plates 3 is located in a plane lower than that between the outermost plates as shown, and the upper edge of the front and upper vane is approximately in the same horizontal plane as the lower front and outer edge of the housing 5.

With this construction rays of light such as indicated at 10 emanating from the bulbs 4 pass downwardly and also downwardly and to the rear into the case and light up the merchandise which may be carried in that part of the case substantially at or somewhat below the lower edge of the front display structure described. Glass, even though transparent, reflects some light and the rays reflected by the several glass plates will be projected forwardly from the outer surfaces of said glass plates in accordance with the law of reflection that the angle of reflection is equal to the angle of incidence. With the eye of the observer located at a point such as indicated at 11 in Fig. 1, without the vanes 9 and with the lower front edge of the housing 5 at its lowest practical position, some rays of light would be reflected along or below the line 12 from the eye of the observer to the lower edge of the housing 5. But with the vanes 9 located as shown and described, such rays of light are reflected against the backs of the vanes 9, and such vanes being opaque, the light does not pass therethrough. The front sides of the vanes at least are of a black or dark color. It is of course to be understood that the point 11, indicating the eye of the observer, is variable and may be at many different positions in front of the case 1 and of course will vary in its height above the front in accordance with the height of the person who is looking into the case. But with the simple and practical invention which I have produced, the vanes 9 serve to intercept the undesired forwardly reflected rays of light which otherwise would reach the eye of the observer, and at the same time there is no interference with the vision as to the merchandise within the case and which the observer is to see.

If the plate 6 was not used and attached as shown and described, rays of light from the lights at 4 striking the inner surface of the housing 5 would be reflected back to the glass and from there in turn to the observer's eye. All rays of light however, which are directed from the lights against the inner side of the housing 5 are blocked by the plate 6 so that the image of the underside of the light hood in the glass is obstructed by the plate 6 and does not come to the eye of the observer. The plate 6 located in the position shown, any light rays passing its upper edge to the housing or covering 5 of the lights, shadows the underside and prevents undesirable reflection of such covering housing.

While the invention has been descibed in conjunction with refrigerating show cases, it is to be understood that it is in no way limited to one place of use, but is generally applicable to the lighting of various types and kinds of show cases, show windows and numerous other places which are lighted for the display of merchandise contained by them. The invention is of a very practical and useful nature and is defined in the appended claims, and is to be considered comprehensive of all forms of structure coming within their scope.

I claim:

1. In a display case having a downwardly and forwardly inclined front wall, said wall comprising, a plurality of spaced apart glass plates, and said case having light producing means at the outer side and at the upper end of said inclined wall, with a housing over said light means, the combination of opaque vanes mounted substantially vertically between the spaced apart plates of said wall in a position to intercept rays of light reflected by said glass plates in a forward direction against said plates.

2. In a show case having a transparent downwardly and forwardly inclined front wall wherein said wall comprises, a plurality of spaced apart glass plates located one back of the other, and said case having light producing means located at the front and adjacent the upper edges of said glass plates, and having a housing extending over said light producing means and downwardly in front thereof for a distance below the same, the combination of light intercepting vanes interposed lengthwise between said plates, said vanes being located approximately vertical and the lower edge of the frontmost vane lying in approximately the same horizontal plane with the upper edge of the vane next back thereof, and with the upper edge of the frontmost vane lying in approximately the same horizontal plane as the lower front edge of said housing, as and for the purposes specified.

3. In a show case having a forwardly and downwardly extending inclined front wall comprising, a plurality of spaced apart transparent plates located one back of the other, and with light producing means mounted in front and adjacent the upper edges of said glass plates, and with a housing extending over the light producing means and downwardly in front thereof and below the same, the combination of light intercepting means associated with said glass plates and disposed so that the upper edge of the frontmost of said light intercepting means occupies substantially the same horizontal plane as the lower front edge of said housing, and with the lower edge of said light intercepting means extending downwardly sufficiently far that said light intercepting means intercepts reflected rays of light from the glass plates which normally would extend forwardly and upwardly at an angle to the horizontal below the lower edge of said housing.

4. In a show case having a front downwardly and forwardly inclined transparent wall comprising, a plurality of spaced apart glass plates, and having a light producing means located in front and lengthwise of and adjacent the upper edges of said front wall of the case, and having a housing over said light producing means mounted on the case and extending over and downwardly below the light producing means, the combination of a vane interposed between adjacent glass plates and extending lengthwise of the space therebetween, said vane being of opaque material and located substantially in a plane coincident with light rays emanating from said light producing means directly to the upper edge of said plate.

5. In a display show case having a downwardly and forwardly inclined transparent front wall, said wall comprising, a plurality of glass plates spaced from each other and lying one back of the other, and with light producing means carried by said case in front of and adjacent the upper edges of said glass plates, said light producing means being covered by a housing extending over the same and downwardly in front thereof, the combination of substantially vertical opaque light intercepting devices associated with and lying between said glass plates and extending lengthwise of and spaced therebetween and disposed with reference to the lower outer edge of the housing to intercept rays of light which normally would be reflected from the surfaces of the glass plate outwardly and upwardly at an angle to the horizontal immediately below the outer lower edge portion of said housing.

CLIFFORD B. SHREVE.